Dec. 14, 1943.  L. SEJARTO  2,336,755
APPARATUS FOR GROWING PLANTS
Filed Sept. 17, 1942   2 Sheets-Sheet 1
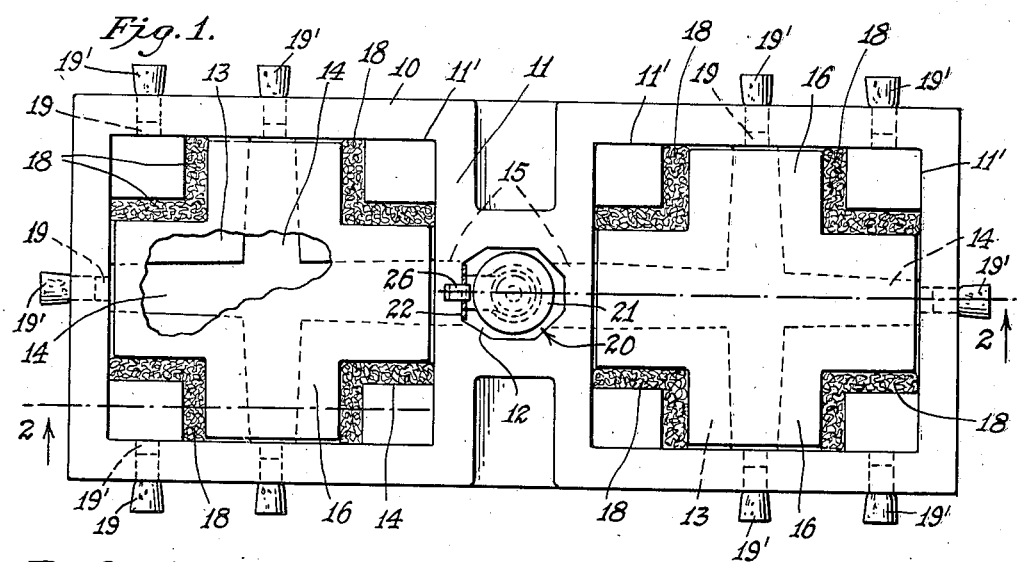
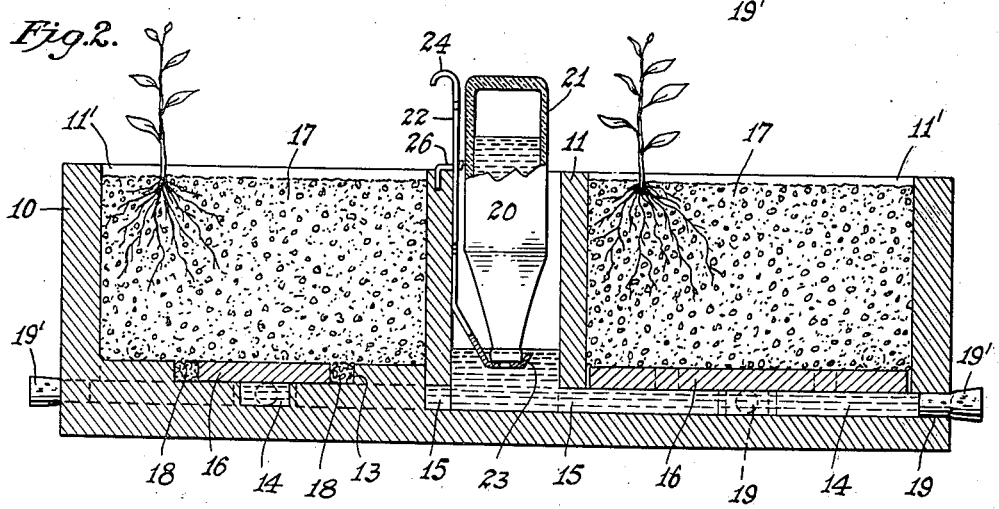
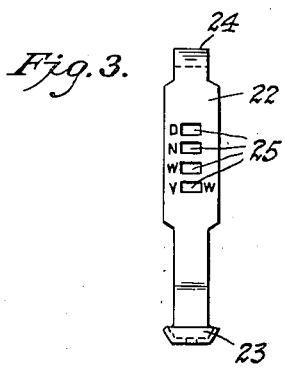
INVENTOR.
Lester Sejarto Dec. 14, 1943.  L. SEJARTO  2,336,755
APPARATUS FOR GROWING PLANTS
Filed Sept. 17, 1942  2 Sheets-Sheet 2
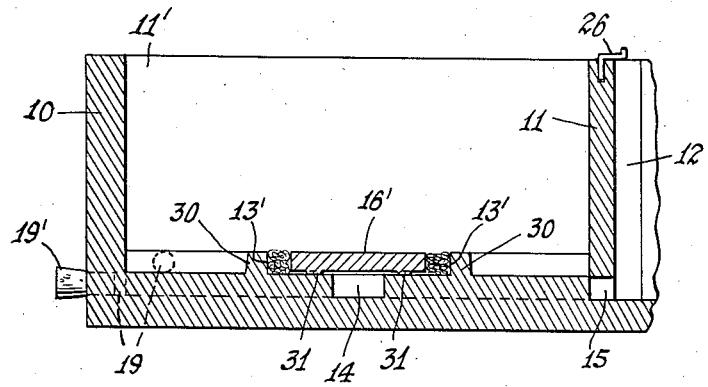
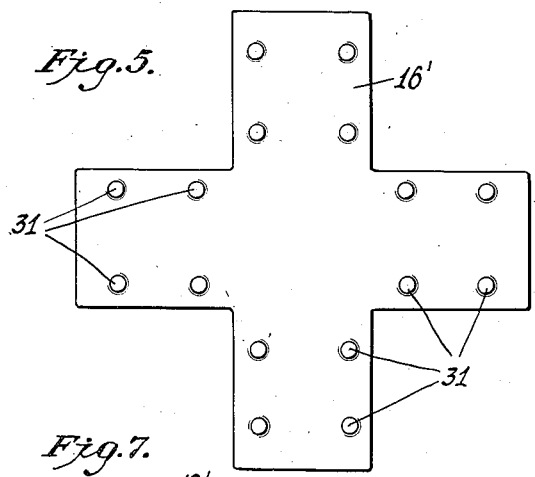
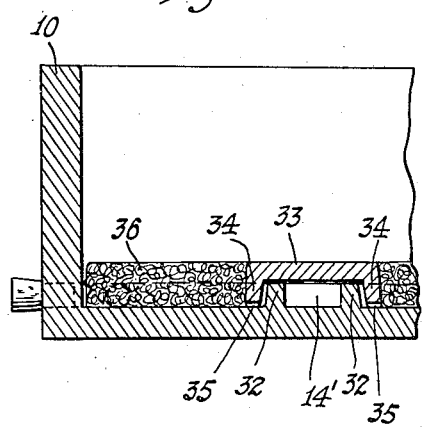
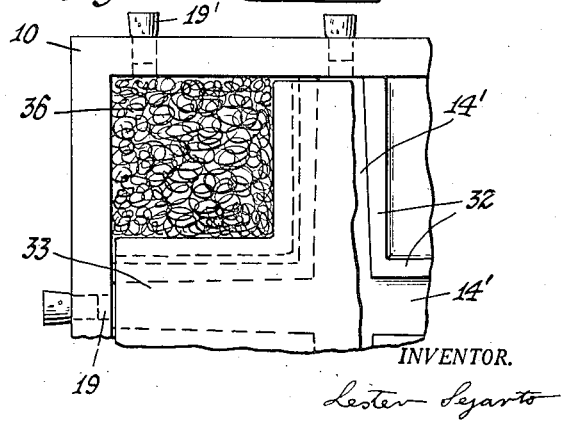
INVENTOR.
Lester Sejarto Patented Dec. 14, 1943

2,336,755

UNITED STATES PATENT OFFICE 2,336,755

APPARATUS FOR GROWING PLANTS

Lester Sejarto, Richmond Hill, N. Y.

Application September 17, 1942, Serial No. 458,638

5 Claims. (Cl. 47—38)

This invention relates to improvements in apparatus for growing plants by the sand process in so-called dirtless farming.

An object of the invention is to provide means whereby the sand or soil in a receptacle, a trough, or bench, may be automatically and continuously supplied with a fluid containing the proper nutrients essential to plant life.

Another object of the invention is to provide means for regulating the volume of fluid so supplied. A further object of the invention is to provide means for effecting a substantially uniform distribution of the fluid for plant consumption.

Another object of the invention resides in the provision of means whereby nutrient solutions which prove to be inappropriate may be flushed out of the apparatus without disturbing growing plants therein.

Other objects and advantages will appear in the following detailed description taken in connection with the accompanying drawings, in which latter, Fig. 1 is a plan view of an apparatus embodying my invention.

Fig. 2 is a vertical section on the line 2—2 of Fig. 1.

Fig. 3 is a view in elevation of the fountain support.

Fig. 4 is a fragmentary section, similar to Fig. 2, showing a modified form of the structure.

Fig. 5 is a bottom plan view of the cover member shown in Fig. 4.

Fig. 6 is a fragmentary section, similar to Fig. 2, showing a further modification, and Fig. 7 is a plan view of the structure shown in Fig. 6.

Referring now in detail to the drawings, and particularly to Figures 1 and 2, the numeral 10 indicates a box-like receptacle which may be made of concrete, or other appropriate material. A centrally disposed transverse wall 11 serves to divide the receptacle into two compartments 11', and to provide surrounding walls for a well 12 formed in said wall and from which the nutrient fluid may be supplied to said adjacent compartments. The bottom wall of the compartments is of a particular configuration to provide for a uniform distribution of said fluid. For this purpose there is provided a recess 13 which may be in the form of a cross, with channels 14 formed in the bottom thereof, and likewise in the form of a cross. The channels are relatively narrow, and are preferably tapered so as to be of progressively diminishing area in a direction away from the well 12, for the purpose of reducing the volume of fluid available at points remote from said well to prevent stagnation adjacent such points. Conduits 15 through the central wall 11 provide passageways from the well 12 to the channels 14 of the respective compartments 11'.

It will be apparent that, as the greatest capacity of the channels is at their junction with the well 12, there will be ample flowage therethrough to supply nutrients to the extremities of the channels, and that the volume available throughout the length of the channels will be substantially commensurate with the diminishing requirements toward outlying plants.

Cover members 16, also cruciform, are provided to prevent the channels from becoming obstructed with the soil in the compartments, preferably coarse gravel indicated at 17. The cover members rest on the bottom wall of the recesses 13 and, while complementary in shape to the recesses, are dimensioned so as to be in spaced relationship to the adjacent side walls of the recesses at the four corners of the respective compartments. The spacing thus provided may be filled with glass wool packing 18, or other suitable fibrous material adapted to exclude the material 17 but allow seepage of liquid from channels 14. Outlets 19 through the end and side walls of the receptacle, and closed by corks 19', provide means for drainage.

It will be understood that apparatus of the kind described herein is used empirically. The condition of the plants is closely observed, and a change in the catalytic agent may be needed if they are not thriving. Also, when the fruit appears, as in tomatoes, a different formula is more advantageous than that used during periods of earlier growth. At such times, or when it is necessary to correct mistakes in judgment, the fountain 20 may be removed, the corks 19' withdrawn and the solution drained off and salvaged. Then the entire apparatus may be thoroughly flushed out with water, and without disturbing the growing plants. Following this procedure further experiments may be undertaken, or the solution known to be proper at this stage, may be substituted in the fountain. It has been noted that at times needed solutions are greedily consumed by the plants in a few hours, while others last for relatively long periods of time.

Means are provided for automatically maintaining the level of the nutrient solution in the well 12 at a predetermined height, and also to replenish the supply in the well commensurate with the amount of solution consumed by the plants. For this purpose there is provided a barometric fountain 20 which may be in the form of a commonly used bottle 21 held in an inverted position as shown, by a support 22 of suitable length to extend above the top of the well 12, and having a socket 23 at its lower end for engagement with the mouth of the bottle, and a hook 24 at its upper end for finger engagement. The support 22 may be made of metal protected by a vitreous coating, or of other material that is immune to solutions of this character, such as glass or porcelain. It is provided with a plurality of spaced openings 25 adapted to be selectively engaged with a hook 26 moulded in the top of the wall 11, or otherwise secured to the receptacle. It will now be obvious that the bottle 21 may be suspended from the hook 26 by means of the support 22 and any one of said openings 25. Indices, such as the alphabetical letters shown in Figure 3, indicate the moisture conditions which will prevail in the compartments when the support 22 is adjusted to corresponding positions, such as "dry," "normal," "wet," and "very wet."

In Figure 4, the recess 13' is located above the general level of the bottom of the receptacle 10. This is accomplished by means of the conforming ribs 30 which define the shape of the recess. Cover members 16' are provided for the same purpose as previously described, but in this instance means are employed for more definitely spacing them from the contiguous bottom wall of the recess 13' consisting of a plurality of bosses 31. Otherwise, as in Figures 1 and 2, the inherent unevenness of the contacting concrete surfaces is relied upon to afford sufficient passageways for the egress of the fluid from the channels 14 to and through the packing 18, hence to the soil 17, and, by capillary action therethrough, to the roots of the growing plants.

In the modified structure of Figure 6, the recesses have been omitted, and the channels 14' are formed above the general level of the bottom of the receptacle 10, in a manner similar to the formation of the recesses 13', by the conforming ribs 32. In this instance cover members 33 are provided with depending flanges 34 at opposite sides which overlap the ribs 32 and rest on the bottom wall of the receptacle. The flanges 34 may be slightly notched, as at 35, to provide for the egress of the fluid. Clearance is provided between the cover members and the top and sides of the ribs 32 for the same purpose. As shown in Figure 7, fibrous, or wick-like material 36 may be packed in the four corners of each receptacle compartment level with the top of the cover members. The packing 36 prevents the sand or gravel 17 from obstructing the passageways between the notches 35, so that the overflowing fluid in the channels 14' may reach and saturate the packing 36, and, in consequence thereof, moisten the soil for the purpose set forth, and at the same time, like the packing 18, serves to restrict the free escape of the fluid nutrients.

The embodiment of the invention shown in the drawings is particularly advantageous for the use of amateur gardeners interested in artificial propagation of plants. The invention, however, is equally advantageous for professional use in which very much larger, narrow troughs may be utilized, and in which either a plurality of suitably spaced supply wells and fountains may be employed, or a proportionally larger single fountain. In such long and narrow troughs channels may be employed without transverse branches. The cruciform channels shown are not to be taken as limiting the invention thereto.

I claim:

1. In an apparatus for growing plants the combination of a receptacle containing a medium for supporting the plants, a well containing a fluid for said plants, the bottom of said receptacle having a channel formed therein leading from said well across said receptacle, a fountain mounted in said well operatively adapted to supply it with fluid at different selectable levels, a cover for said channel supported on the bottom of said receptacle beneath said medium, said cover being fashioned to provide spaces between the edges of same and the adjacent walls of said receptacle, and fibrous packing in said spaces, the contiguous surfaces of the cover and the receptacle being characterized by relatively small passageways for the egress of the fluid from the channel to said packing, said cover and said packing being substantially at the same level and providing a false bottom in which the packing is effective to restrict the free escape of fluid from the channel to the plant-supporting medium.

2. In an apparatus for growing plants the combination of a receptacle containing a mineral aggregate for supporting the plants, a well containing a nutrient solution, upstanding ribs on the bottom of said receptacle defining a recess above the general level of said bottom, a channel in the bottom of said recess below the said general level, a cover member for said channel, means for supporting said cover member on the bottom of said recess to provide for seepage of said solution therebetween, the opposite edges of said cover member being spaced from said ribs, fibrous packing in said spaces, said packing and the top of said cover member being substantially flush with the top of said ribs and in contact with said aggregate, means for automatically maintaining the solution in said well at any one of a plurality of different levels to thereby control the extent of said seepage to said aggregate.

3. In an apparatus for growing plants the combination of a receptacle having a transverse wall dividing the same into compartments containing a mineral aggregate for supporting the plants, said wall having a well formed therein containing a nutrient solution, means adapted to supply said solution to said well and maintain the same at any one of a plurality of different levels, the bottom of said compartments having cruciform channels in communication with said well, cruciform cover members for the said channels respectively supported on the bottom of said compartments, and having their edges spaced from adjacent surfaces of said compartments, fibrous packing in said spaces, and the contiguous surfaces of the cover members and the compartments being adapted to provide for seepage of said solution therebetween, and to said packing and aggregate for the purpose set forth.

4. In an apparatus for growing plants the combination of a receptacle having a transverse central wall dividing the same into rectangular compartments containing a mineral aggregate for supporting the plants, said wall having a well formed therein containing a nutrient solution, a fountain adapted to supply said well and maintain said solution at any selected one of a plurality of different levels, the bottom of said compartments having a cruciform recess with a substantially complementary cruciform channel in the bottom thereof communicating with said well, cruciform covers for said channels loosely supported on the bottom of said recesses to provide for seepage therebetween, and fibrous packing in the corners of said compartments between the walls thereof and the edges of said cover members.

5. In an apparatus for growing plants, a receptacle containing a medium for supporting the plants, the bottom of said receptacle having a channel, means for supplying a fluid to said channel and for regulating the flow thereto, a cover for said channel supported on the bottom of the receptacle beneath said medium and providing for the seepage of the fluid therebetween, said cover being fashioned to provide spaces between the edges of same and the adjacent walls of the receptacle, and fibrous packing in said spaces, said cover and said packing providing a false bottom in the receptacle in which the packing is effective to restrict the free escape of said fluid from the channel to the plant-supporting medium.

LESTER SEJARTO.